(12) United States Patent
Zhou et al.

(10) Patent No.: US 7,538,766 B2
(45) Date of Patent: May 26, 2009

(54) PRE-COMPUTED SHADOW FIELDS

(75) Inventors: Kun Zhou, Beijing (CN); Yaohua Hu, Beijing (CN); Stephen S. Lin, Beijing (CN); Baining Guo, Beijing (CN); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/147,921

(22) Filed: Jun. 8, 2005

(65) Prior Publication Data

US 2006/0279570 A1 Dec. 14, 2006

(51) Int. Cl.
*G06T 15/00* (2006.01)

(52) U.S. Cl. .................. 345/426; 345/419; 345/582; 382/274

(58) Field of Classification Search ................. 345/419, 345/421, 422, 426, 582; 382/274
See application file for complete search history.

(56) References Cited

U.S. PATENT DOCUMENTS

| | | | | |
|---|---|---|---|---|
| 5,870,097 | A * | 2/1999 | Snyder et al. | 345/426 |
| 6,876,362 | B1 * | 4/2005 | Newhall et al. | 345/426 |
| 7,061,488 | B2 * | 6/2006 | Randel | 345/426 |
| 7,064,755 | B2 * | 6/2006 | Mech et al. | 345/426 |

\* cited by examiner

*Primary Examiner*—Phu K Nguyen
(74) *Attorney, Agent, or Firm*—Lee & Hayes, PLLC (57) ABSTRACT

Pre-computed shadow fields are described. In one aspect, shadow fields for multiple entities are pre-computed. The shadow fields are pre-computed independent of scene configuration. The multiple entities include at least one occluding object and at least one light source. A pre-computed shadow field for a light source indicates radiance from the light source. A pre-computed shadow field for an occluding object indicates occlusion of radiance from the at least one light source.

20 Claims, 7 Drawing Sheets

PRE-COMPUTED SHADOW FIELDS

BACKGROUND

Soft shadows from area light sources can add striking realism to a computer-generated scene. Computing soft shadows for interactive applications, however, is difficult because of the complex dependence of soft shadows on light sources and scene geometry. Soft shadows are typically generated by combining multiple shadow maps, extending shadow volumes, or by computing geometrically incorrect (fake) soft shadows with a radiosity based approach. Although these techniques have become increasingly efficient, each technique is substantially restricted in that luminance is based on small or point-like area sources. To make matters worse, such existing techniques cannot efficiently handle environment maps to deal with the special case of distant illumination.

Recently, researchers have developed techniques such as pre-computed radiance transfer (PRT) for the special case of distant illumination. PRT methods focus on transferring distant illumination from environment maps to an object. To handle dynamic local illumination, PRT generally requires lighting to be densely sampled over the object at run-time. Additionally, complex local illumination with moving occluders often induces frequent, time-varying fluctuations in gradients, which in turn, may also necessitate dense sampling operations for all-frequency shadow rendering in a dynamic scene. (A dynamic scene typically includes dynamic illumination conditions produced by light sources and/or objects in motion). Such dense sampling operations at run-time can computationally be prohibitively expensive. Thus, the problem of efficient shadow computation under combined illumination of general local light sources and environment maps remains unsolved.

Figure 1:
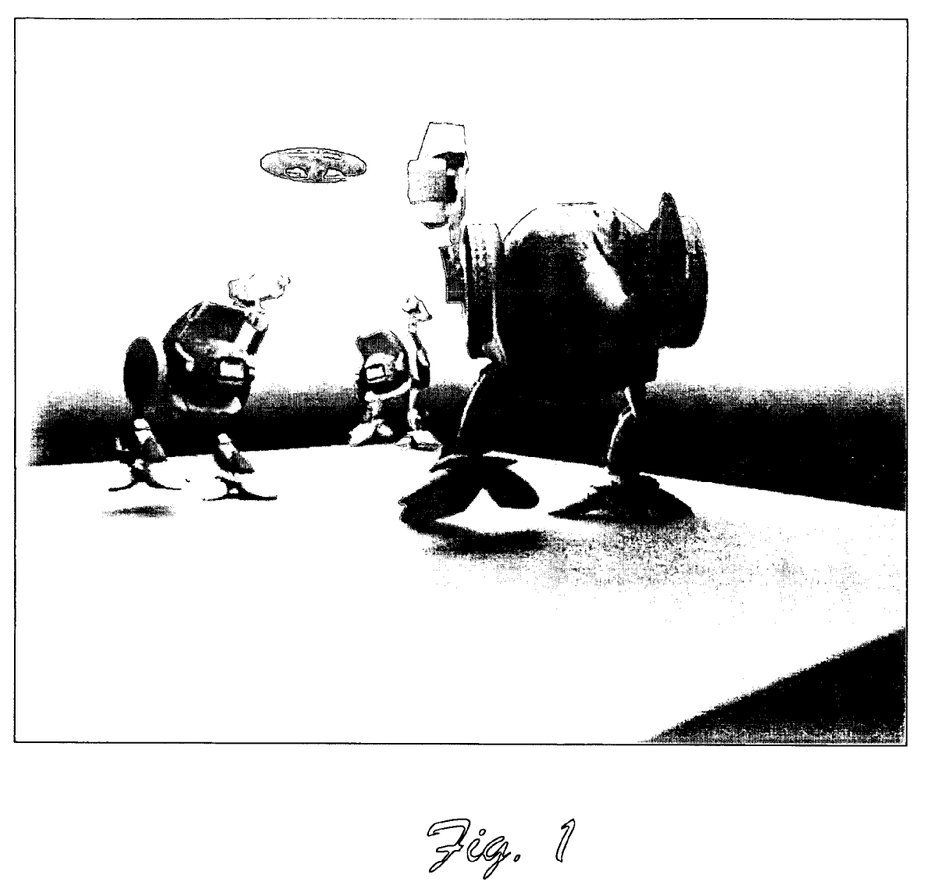
FIG. 1 illustrates an exemplary shot of a dynamic scene configuration.

Computing soft shadows is even more challenging for dynamic scenes (e.g., see FIG. 1), wherein some combination of objects, local light sources, and the environment map are in motion. Because of this, computational costs increase rapidly as the numbers of objects and light sources increase. The high run-time expense cannot be reduced by pre-computation of shadow maps. This is because shadow maps and shadow volumes are typically determined with respect to a specific arrangement of lights and occluders within a particular scene configuration or geometry. With PRT, dynamic scenes present an even greater problem, because pre-computed transfer matrices are valid only for a fixed scene configuration. The pre-computed transfer matrices do not generalize to dynamic scenes that contain moving local light sources and numerous degrees of freedom. Moreover, re-computing transfer matrices for moving objects on the fly is typically not an option because it is computationally prohibitive.

SUMMARY

Pre-computed shadow fields are described. In one aspect, shadow fields for multiple entities are pre-computed. The shadow fields are pre-computed independent of scene configuration. The multiple entities include at least one occluding object and at least one light source. A pre-computed shadow field for a light source indicates radiance from the light source. A pre-computed shadow field for an occluding object indicates occlusion of radiance from at least one light source.

BRIEF DESCRIPTION OF THE DRAWINGS

In the Figures, the left-most digit of a component reference number identifies the particular Figure in which the component first appears.

FIG. 5 is provided to show results of exemplary object occlusion field wavelet compression under environment lighting. More particularly, FIG. 5 is a reference image for images of FIGS. 6-8.

FIG. 6 is provided to show results of exemplary object occlusion field (OOF) wavelet compression under environment lighting. More particularly, FIG. 6 illustrates an image based on OOF rendering without compression.

FIG. 7 is provided to show results of exemplary object occlusion field (OOF) wavelet compression under environment lighting. More particularly, FIG. 7 shows an image based on two-hundred (200) wavelet coefficients.

FIG. 8 is provided to show results of exemplary object occlusion field wavelet compression under environment lighting. More particularly, FIG. 8 shows an image that is based on fifty (50) wavelet coefficients.

DETAILED DESCRIPTION

Overview

The systems and methods for pre-computed shadow fields efficiently compute soft shadows for dynamic scenes as a function of a new shadow representation called a "shadow field." A shadow field describes the shadowing effects (illumination and occlusion effects) of an individual scene entity at sampled points in space surrounding the scene entity. A shadow field for a local light source is represented with a source radiance field (SRF). A SRF includes cube maps that record incoming light from the illuminant at surrounding sample points in an empty space. An environment map is represented as a single spatially independent SRF cube map. For an object, a set of object occlusion fields (OOF), represented as cube maps, conversely records occlusion of radiance by the object as viewed from sample points around it. In view of the above, a shadow field consists of a set of cube maps. As described below, combining corresponding cube maps for a given scene configuration and scene point provides a cube map that represents the incoming illumination at that scene point. Converting this incoming illumination into soft shadow involves a multiplication with the BRDF of the point.

A shadow field is pre-computed independent of scene configuration or geometry. This is because a shadow field represents shadowing effects of a single scene element in an empty space. Thus, shadow fields can be pre-computed before any scene geometry or luminance is fixed. This property of shadow fields enables substantially efficient soft shadow computation in dynamic scenes. More particularly, because shadow fields are pre-computed, shadowing effects at any receiver point (scene point) can be computed at run-time as a simple combination of SRFs and OOFs according to the then determined scene configuration. This is in stark contrast to conventional techniques, which can compute shadow maps, shadow volumes, and PRT transfer matrices, only after scene geometry has been fixed, and in the case of shadow maps and volumes, after the illuminants have been fixed.

Shadow fields can also be quickly combined at run-time to generate soft shadows. Specifically, for any configuration of light sources and objects in a dynamic scene, the incident radiance distribution at a given point is determined by combining corresponding shadow fields using simple coordinate transformations, multiplications, and additions. Shadow fields represent both local light sources and environment maps as respective SRF cube maps. Such representations substantially facilitate scenarios where combined illumination of local light sources and environment maps are addressed.

Compression can considerably reduce, with low error, the size of shadow fields. For instance, for applications in which low frequency shadows are acceptable, cube maps are represented with spherical harmonics. In another example, for all-frequency applications, wavelets are used. Soft shadows can be directly rendered from compressed SRFs and OOFs. For low frequency-shadowing, dynamic scenes that contain numerous objects can be rendered in real time. For all-frequency shadows, real-time rendering is achieved for relighting of static scenes. Dynamic all-frequency shadowing in scenes with moving and non-rotating light sources and objects are rendered at interactive rates.

These and other aspects of pre-computed shadow fields are now described in greater detail with respect to FIGS. 2 through 10.

An Exemplary System

Although not required, the systems and methods for pre-computed shadow fields are described in the general context of computer-executable instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 2:
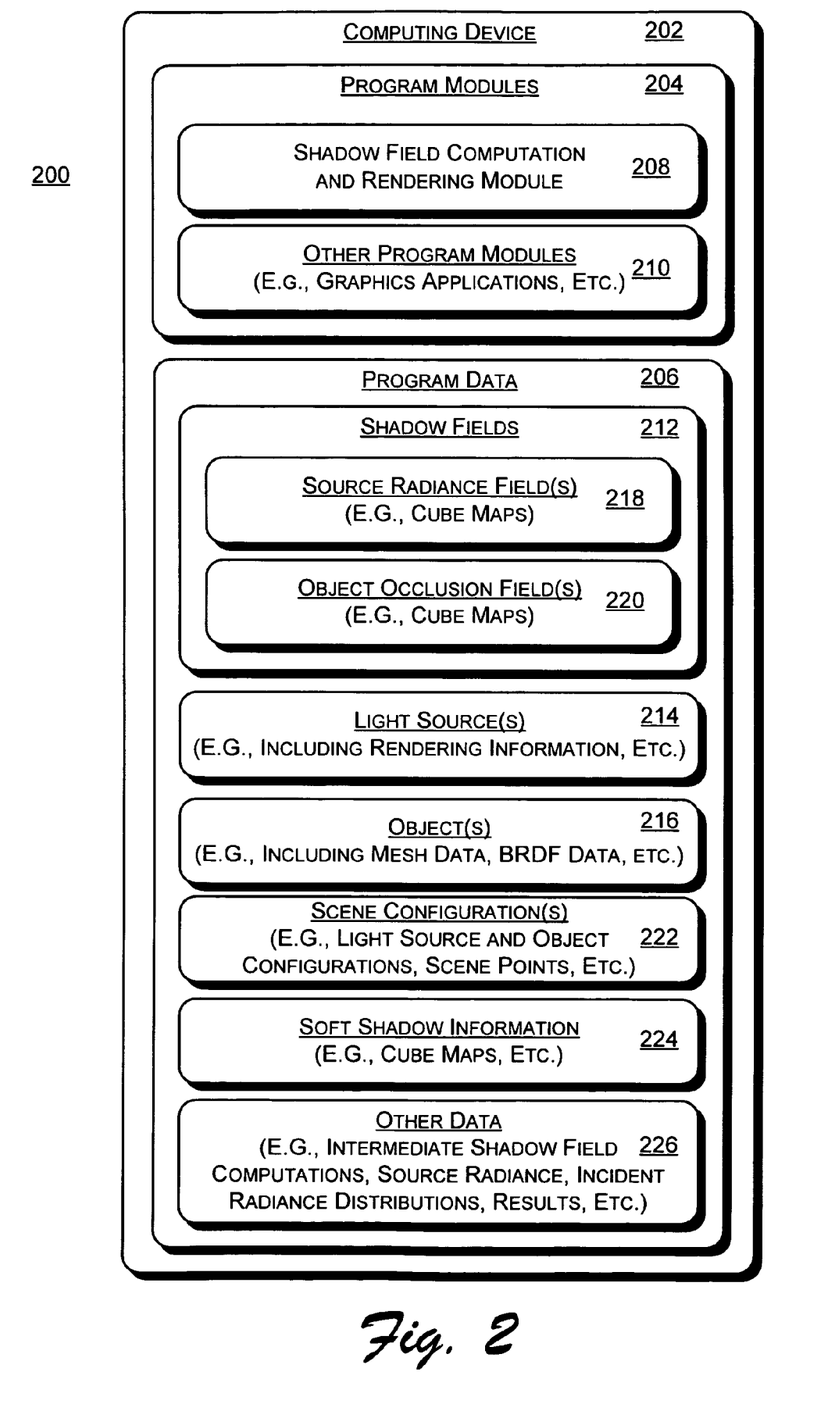
FIG. 2 shows an exemplary system for creating and using pre-computed shadow fields to generate soft shadows for objects in dynamic scenes.

FIG. 2 shows an exemplary system 200 for creating and using pre-computed shadow fields to generate soft shadows in dynamic scenes. System 200 includes a general purpose computing device 202. Computing device 202 represents any type of computing device such as a personal computer, a laptop, a server, handheld or mobile computing device (e.g., a cellular phone, personal digital assistant), and/or so on. Computing device 202 includes program modules 204 and program data 206. Program modules 204 include, for example, shadow field computation and rendering module 208 (hereinafter often referred to as "shadow field module 208") and other program modules 210 such as a graphics application that leverages the shadow field computing and rendering capabilities of shadow field module 208.

Shadow field module 208 generates shadow fields 212 for light sources 214 and objects 216 independent of any scene configuration. A shadow field 212 for a light source 214 is a Source Radiance Field (SRF) 218. A SRF records radiance from an illuminant (i.e., a light source 214) as one or more cube maps at sampled points in space surrounding the illuminant. A shadow field 212 for an object 216 (i.e., an "occluder") is an Object Occlusion Field (OOF) 220. For an occluder, an OOF 220 represents the occlusion of radiance with respect to one or more sampled points surrounding the object 116. Once shadow fields 212 have been pre-computed, and in view of a current scene configuration 222 (e.g., a dynamic scene), shadow field module 208 rapidly computes shadow information 224 at any receiver point (i.e., a point on an object 216) of the current scene configuration 222. To accomplish this, shadow field module 208 combines SRFs 218 and OOFs 220 according to corresponding ones of the light sources 214 and objects 216 in the current scene configuration 222.

The following sections describe exemplary techniques to represent, pre-compute, and combine shadow fields 212 to determine incident radiance distribution at a scene point (derived from scene configuration 222), and an exemplary framework for rendering soft shadow information 224).

Exemplary SRF and OOF Pre-Computation

The effect of a light source 214 or occluding object 216 can be expressed as a shadow field 212 in the space that surrounds the light source and/or object. With respect to a local light source $L_i$, its radiated illumination at an arbitrary point $(x,y,z)$ in the scene 222 can be expressed as a 6D plenoptic function $P(x,y,z,\theta_{in},\phi_{in},t)$, where $(\theta_{in},\phi_{in})$ is the incident illumination direction and t denotes time. Re-parameterizing the position $(x,y,z)$ as polar coordinates $(R_p,\theta_p,\phi_p)$ with respect to the local frame of the light source and removing the time dependency, a source radiance field can be represented as the 5D function $S(R_p,\theta_p,\phi_p,\theta_{in},\phi_{in})$, or equivalently as cube maps $(\theta_{in},\phi_{in})$ as a function of position $(R_p,\theta_p,\phi_p)$. Occlusion fields 220 are similarly expressed, with the exception that they represent alpha values, rather than radiance intensities.

Figure 3:
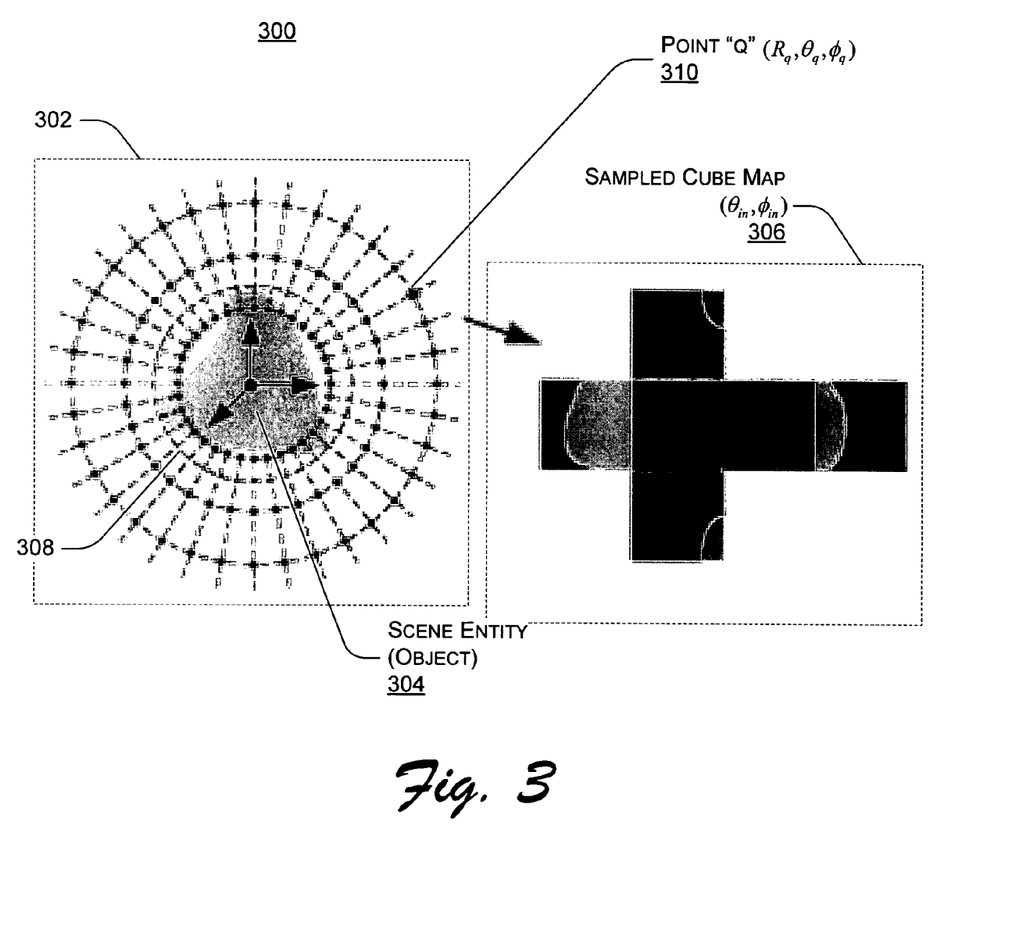
FIG. 3 shows exemplary shadow field sampling of a scene object and a resulting cube map.

FIG. 3 shows exemplary shadow field sampling 302 of a scene entity 304 (i.e., an object 216) and a resulting cube map 306. For purposes of exemplary illustration, the operations of the procedure are described in reference to the components of FIG. 2. In the figures, the left-most digit of a component reference number identifies the particular figure in which the component first appears. Referring to FIG. 3, the SRF 218 of each light source 214 and the OOF 220 of each local object 216 is individually pre-computed at sampled locations surrounding empty space as illustrated, for example, in FIG. 3. More particularly, at each sampled point in the surrounding empty space, system 200 records a cube map (shadow field 212) that gives the directional occlusion or lighting distribution at the point. This may be computed by casting rays from the point towards each direction that is sampled in a cube map, and determining whether these rays intersect the given object or light source. Note that radial and angular sampling $(R,\theta,\phi)$ of cube map positions on concentric shells surrounding the scene entity 304. Concentric shell 308 is a bounding sphere of the scene entity 304. Cube map 306 represents the sampled cube map $(\theta_{in},\phi_{in})$ of point "q" 310. In this implementation and while substantially optimal sampling densities could be established from a detailed analysis, system 200 allows the user to empirically determine, for each shadow field 212, the radial and angular sampling densities that result in an acceptable level of error.

Shadow field module 208 handles distant illumination represented by an environment map, as a special light source 214 with a shadow field $S_d$ (112). Shadow field $S_d$ is independent of spatial location and may undergo changes such as rotations. Distant lighting is farther away from any scene point than any local entity 214 or 216. The self-occlusion of an object 216 at a surface point p can similarly be expressed as a special object occlusion field $O_p$ that is pre-computed at sampled points on an object's surface and is considered the closest entity to any point on the object 216.

Exemplary Incident Radiance Computation

With movement of light sources 214 and objects 216, lighting and visibility can change rapidly within a scene 222 and vary significantly among different scene points. To render a soft shadow 224 at a given scene point, the pre-computed SRFs 218 and OOFs 220 of illuminants 214 and objects 216 are quickly combined according to the scene configuration 222 to solve for the incident radiance distribution.

To determine the contribution of a particular light source 214 to the incident radiance distribution of a soft shadow point (i.e., a respective portion of soft shadow information 224), the visibility of the light source 214 from the point is computed with respect to the occluding objects 216 in the scene 222. Conventional systems typically need to trace rays between the illuminant and the point to accomplish this. In contrast, system 200 accomplishes this through simple operations on pre-computed shadow fields 212. To this end, shadow field computation and rendering module 208 aligns the shadow fields 208 induced by the illuminant 214 and scene objects 216 to their respective scene 222 positions and orientations using coordinate transformations. Shadow field module 208 sorts the distances of these scene entities from the shadow point from near to far. To avoid ambiguity in this distance sort, bounding spheres of objects 216 are constrained such that they do not enter bounding spheres of light sources 214.

For objects 216 that lie closer to the point than the light source 214, their respective OOFs 220 are multiplied to solve for their aggregate occlusion. Shadow field module 208 multiplies the resulting product by the SRF 218 of the light source 214 to yield the source radiance that arrives at the shadow point. Shadow field module 208 adds the contributions of each light source 214 in the scene 222 to provide a final incoming radiance distribution that determines the soft shadow 224 at the point. (For purposes of exemplary illustration, determined source radiance and final incoming radiance distributions are shown as a respective portion of "other data" 226).

Figure 4:
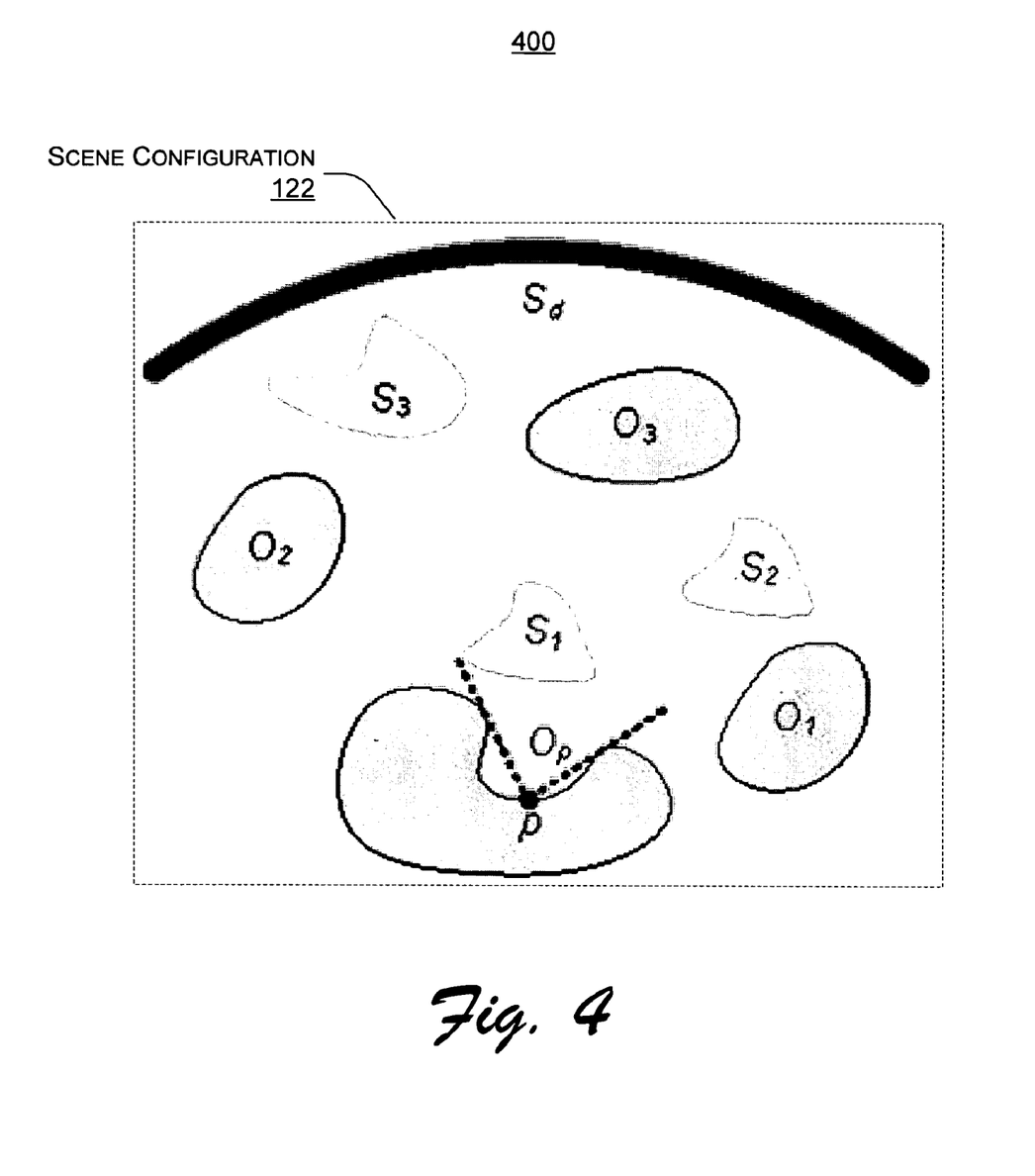
FIG. 4 shows an exemplary combination of shadow fields to obtain an incident radiance distribution.

FIG. 4 shows an exemplary combination of shadow fields to obtain an incident radiance distribution. For purposes of exemplary illustration, the operations of the procedure are described in reference to the components of FIG. 2. In the figures, the left-most digit of a component reference number identifies the particular figure in which the component first appears. Referring to FIG. 4, light sources 214 are represented with the letter "S", and objects 216 are represented with the letter "O".

Incident radiance distribution at p is computed as follows. For each scene entity (light source 214 or object 216), its corresponding shadow field 212 is translated and rotated according to its position and orientation in the scene 222. The only potential occluders of a given light source 214 are objects 216 that lie closer to p, determined by a distance sorting of the shadow fields 212.

For $S_1$, only the object 216 that p itself lies on can occlude it. The incident lighting from $S_1$ can be expressed as $S_1(p)*O_p$, where * denotes a product of corresponding cube map entries. For $S_2$, an additional object $O_1$ may occlude it. Therefore, its lighting contribution is $S_2(p)*O_1(p)*O_p$. Since the other local light source $S_3$ and the environment illumination $S_d$ are both farther from p than all the occluders in the scene, the radiance at p that arrives from $S_3$ and $S_d$ are respectively $S_3(p)*O_3(p)*O_2(p)*O_1(p)*O_p$ and $S_d*O_3(p)*O_2(p)*O_1(p)*O_p$. Shadow field computation and rendering module 208 sums the radiance from each light source 214 to obtain the incident radiance distribution at p. Rather than directly adding together the radiances from all light sources 214, the sum can be computed more efficiently as follows by extracting the common occluders of different lights:

$$(((S_d+S_3(p))*O_3(p)*O_2(p)+S_2(p))*O_1(p)+S_1(p))*O_p.$$

Many scenes 222 contain multiple instances of a given object 216 (e.g., $O_1$ and $O_2$ in FIG. 4) or light source 214 (e.g., $S_1$ and $S_2$ in FIG. 4). In one implementation, system 200 maintains only a single respective OOF 220 for each instance of a particular object 216. Analogously, system 200 maintains only a single respective SRF 218 for all instances of a particular light source 214.

Exemplary Data Sampling and Compression

Shadow fields need not be sampled throughout the entire space, since shadowing effects decay with increasing distance. Sampling only within the space near the object 216 or light source 214 is sufficient. The phrase "entire space" refers to an infinite space surrounding an object or light source. In one implementation, shadow field computation and rendering module 208 sets the radius of the largest sphere according to the size of the local scene 222, or at a distance beyond which the entity has a negligible effect.

In this implementation, twenty-six (26) concentric spheres uniformly distributed between 0.2 r and 8 r, where r is the radius of the bounding sphere, are used for low-frequency shadows. For all-frequency shadows, denser sampling is implemented. In this implementation, thirty-two (32) spheres ranging from 0.2 r to 20 r are utilized for all-frequency shadows. From points beyond the largest radial distance, system 200 disregards shadowing effects of an entity. In other words, shadow field computation and rendering module 208 samples each sphere angularly at projected points from a cube map bounded by the sphere. For low frequency effects, the sampling need not be dense. In view of this, this implementation utilizes 26 concentric spheres, each angularly sampled at 6×16×16 directions of a cube map, for all the low-frequency examples. Since all-frequency shadow fields require a high sampling density for accurate representation, this implementation utilizes 32 spheres of 6×32×32 samples.

At each sample point, a cube map representing the incoming light or occlusion is computed and recorded. As described above, the set of all cube maps pre-computed for an object/light (at the set of sampled surrounding points) composes its OOF/SRF. In this implementation, shadow field computation module 208 approximates shadow fields 212 at intermediate points in a scene 222 by trilinear interpolation of the eight nearest samples. This implementation utilizes the sampling density of eight (8), However, in a different implementation, a user may select different sampling densities for different entities (114 and/or 216) in a scene 222. For a simple object 216 such as a sphere, sparse sampling yields accuracy at a low storage cost, while an intricate object like a plant may require denser sampling for high fidelity.

Although raw data for a shadow field 212 can consume a substantial amount of data storage space, a shadow field 212 can be compressed with low error by representing SRF and OOF cube maps in terms of spherical harmonics for applications in which low-frequency shadows are sufficient, and using wavelets for all-frequency applications. In one implementation, fourth or fifth order spherical harmonics provide good shadowing results on typical meshes in smooth lighting environments. In an exemplary low-frequency implementation, shadow field computation module 208 utilizes fourth-order spherical harmonics expressed by 26 basis function coefficients, each quantized to 8 bits, to approximate cube maps of a shadow field 212. For low frequency effects represented with a 6×16×16 cube map at each sampled point in the surrounding space, the data size for each OOF 220 is 384 KB, while a 3-channel SRF 218 occupies approximately 2 MB.

In one implementation, and for all-frequency applications, shadow field computation module 208 utilizes 6×32×32 cube maps, which have 6144 wavelet basis functions. Cube maps for SRFs 218 and OOFs 220 are very sparse, with most nonzero entries aggregated in concentrated regions for typical objects 216 and light sources 214.

Figure 5:
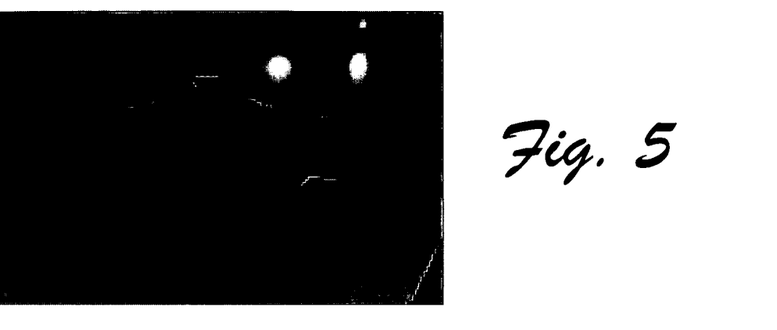
Figure 6:
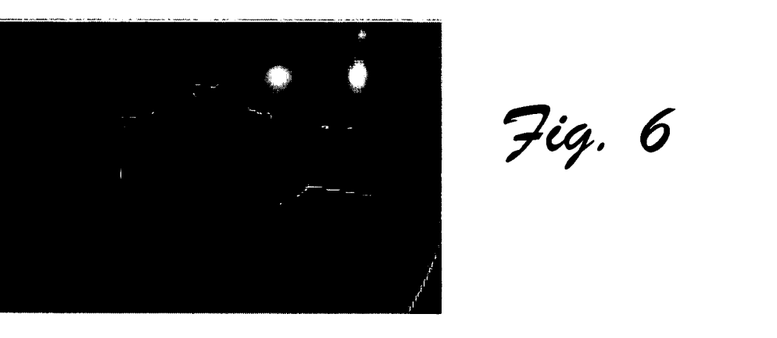
Figure 7:
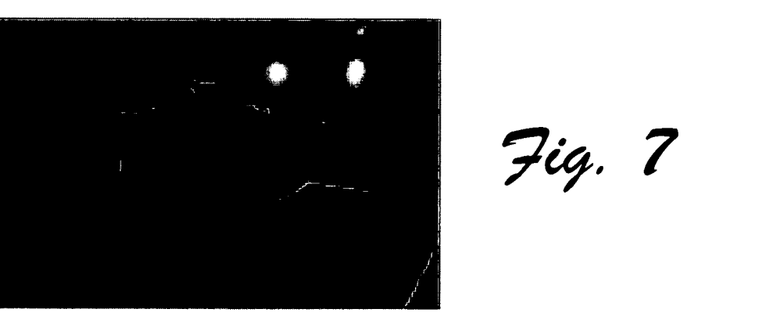
Figure 8:
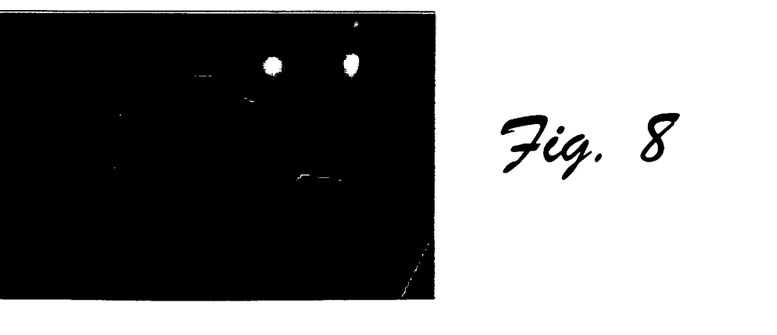

FIGS. 5-8, in combination, are provided to show results of exemplary OOF wavelet compression under environment lighting. FIG. 5 is a reference image for images of FIGS. 6-8. FIG. 6 illustrates an image based on OOF rendering without compression. FIG. 7 shows an image based on two-hundred (200) wavelet coefficients. FIG. 8 shows an image that is based on fifty (50) wavelet coefficients. For example, the OOF 220 of the teapot model shown in FIG. 5 has an average of two-hundred-sixty-eight (268) nonzero wavelet coefficients per sample point. With this sparsity and the area-weighted compression scheme for cube maps, OOFs 220 may be adequately compressed, for example, with low error to 2%-4% of their raw data size. Differences in rendering quality at various compression rates are exhibited in FIG. 5, where the reference image is rendered using the pre-computed visibility of each vertex on the planar surface. The difference between the reference image and the uncompressed OOF rendering image (FIG. 6) demonstrates little visible error caused by OOF sampling. As compared to respective object shapes, light sources 214 tend to have relatively simple shapes. As a result, SRFs 218 can typically be compressed to 0.1%-1% of their original data size.

Exemplary Soft Shadow Rendering

As described above, shadow field module 208 pre-computes and combines shadow fields 212 to determine the incident radiance distribution at arbitrary points of a scene 222. Shadow field module 208 factors in the Bidirectional Reflection Distribution Function (BRDF) for the various types of materials that comprise entities in the scene 222. A BRDF is included in a representation of an entity. A BRDF is given for each vertex of the entity, and at intermediate surface points the BRDF is interpolated from the vertices. More particularly, shadow field module 208 computes soft shadow information 224 at a point in a scene 222 as a function of the following rendering equation.

$$B(x, \omega_o) = \int_\Omega L(x, \omega_i) V(x, \omega_i) \rho(x, \omega_i, \omega_o)(\omega_i \cdot n) d\omega$$
$$= \int_\Omega L(x, \omega_i) V(x, \omega_i) \rho\%(x, \omega_i, \omega_o) d\omega,$$

wherein B is the exitant radiance as a function of position x and outgoing direction $\omega_o$, L is the lighting vector with incident direction $\omega_i$, V is the visibility function, $\rho$ is the BRDF, n denotes the surface normal, and $\rho\%$ is the product of the BRDF and a cosine term $\omega_i \cdot n$. In this implementation, shadow field computation and rendering module 208 evaluates this rendering equation using shadow fields 212 as shown in TABLE 1.

TABLE 1

EXEMPLARY SHADOW FIELD RENDERING ALGORITHM

Rotate distant lighting $S_d$ to align with global coordinate frame
For each scene entity that is an object, do TABLE 1-continued

EXEMPLARY SHADOW FIELD RENDERING ALGORITHM

For each vertex p, do
  $B_p = 0$
  $T_p = $ TripleProduct( $O_p$, $\rho\%$)
  Rotate $T_p$ to align with global coordinate frame
  Compute distance from p to each scene entity
  Sort entities in order of increasing distance
  For each entity J do
    If J is a light source
      query SRF array to get its SRF $S_J(p)$
      rotate $S_J(p)$ to align with global coordinate frame
      $B_p$ += DoubleProduct( $S_J(p)$, $T_p$)
    Else
      query OOF array to get its OOF $O_J(p)$
      rotate $O_J(p)$ to align with global coordinate frame
      $T_p = $ TripleProduct( $O_J(p)$, $T_p$ )
$B_p$ += DoubleProduct( $S_d$, $T_p$ )

In system 200 of FIG. 2, as described above, each object 216 is associated with the respective OOF 220, mesh data, BRDF data, and a self-visibility function for each vertex with respect to the object's local frame. The global coordinate frame is the coordinate system that is defined with the scene 222. For purposes of exemplary illustration, object mesh data, BRDF data, and a self-visibility function for each vertex of the object are represented by respective portions of "other data" 226. System 200 stores an SRF 218 and associated rendering information for each light source 214.

As described in TABLE 1, shadow field module 208 processes effects of surrounding scene entities (objects 216 and/or light sources 214) from near to far when computing outgoing radiance distribution $B_p$ from a point p. For greater computational efficiency, shadow field module 208 factors in the BRDF at the beginning of the algorithm, rather than determining the incident radiance distribution and then incorporating the BRDF. Shadow field module 208 first computes the product of the self-visibility and the BRDF at p, and stores this product in $T_p$. $T_p$ represents the product of OOFs 220 and the BRDF. In other words, system 200 computes a soft shadow 224 by determining the product of three factors: illumination, occlusion, and BRDF. Multiplying two of these factors (e.g., OOF and BRDF) involves a triple product. Multiplying in the third factor to this result involves a double product. The triple product is computed as a double summation over various products of (spherical harmonic or wavelet) coefficients in O and p, weighted by tripling coefficients, as shown in equation (1). The double product is simply a dot product between the (spherical harmonic or wavelet) coefficient vectors of S and T.

Shadow field module 208 iteratively updates $T_p$ by multiplying OOFs 220 of increasing distance from p. Since each light source 214 can be occluded only by objects 216 located nearer than it to p, shadow field module 208 determines the light source's contribution to outgoing radiance by multiplying the corresponding SRF 218 with the $T_p$ that incorporates the appropriate set of OOFs 220. Shadow field module 208 aggregates contributions of each light source 214 to obtain the soft shadow information 224.

The double product of two functions expressed in an orthonormal basis is simply the dot product of their coefficient vectors. Computing this operation is very fast for both linear spherical harmonics and nonlinear wavelets. In this implementation, shadow field module 208 computes triple products using the following algorithm to calculate the projection $G_i$ on an orthonormal basis $\Psi_i$ of a product $G=E\cdot F$ as $$G_i = \sum_j \sum_k C_{ijk} E_j F_k,$$

wherein $C_{ijk} = \int_{S^2} \Psi_i(\omega) \Psi_j(\omega) \Psi_k(\omega) d\omega$ are tripling coefficients.

To determine soft shadows 224 of a scene point, shadow field module 208, for each scene entity 214 and 216, performs a respective table query with interpolation, a rotation, and a double product for light sources 214 or a triple product for objects 216. Since table queries with interpolation and double products are fast, computational costs of operations associated with shadow field computation and rendering module 208 are principally associated with rotation and triple product operations. In one implementation, and for a spherical harmonic basis, shadow field module 208 computes rotations using a rotation function in DirectX®.

In one implementation, and for wavelets, shadow field module 208 does not implement rotations of local entities in all frequency applications due to the computational expense of such rotations. Shadow field module 208 does implement rotation operations for a wavelet environment map. One exemplary reason for this is that only a single rotation of a corresponding cube map is used to update the environment lighting in the entire scene 222. Shadow field module 208 efficiently handles wavelet rotations for a local entity by pre-computed wavelet projections at sampled rotations of a shadow field 212.

The complexity of triple products for N spherical harmonic basis functions in complex form is $O(N^{5/2})$. Since shadow field module 208 implements low-order spherical harmonic projections in real form, the number of nonzero tripling coefficients is small (e.g., 25 tripling coefficients for third order and 77 tripling coefficients for fourth order). For a wavelet basis, shadow field module 208 implements a sublinear-time algorithm (e.g., see, Ng et al., 2004).

Exemplary Rendering Acceleration

To accelerate rendering, in one implementation, shadow field module 208 employs a two-stage culling technique and utilizes a lazy updating of occlusions. With respect to culling, shadow field module 208 performs visibility operations with respect to the viewer and with respect to remaining vertices. More particularly, and with respect to the viewer, shadow field module 208 culls vertices that do not contribute to screen pixels. With respect to each remaining vertex p, shadow field module 208 culls entities that do not contribute to the remaining vertex's radiance. Such entities exhibit at least one of the following three conditions. First, the bounding sphere of the entity is under the local horizon plane of the vertex. Second, the bounding sphere of the entity is occluded by the inscribed spheres of closer entities. Third, the entity is far enough away from p to be disregarded. This distance is set according to Pp−oP>ε·r, where o is the origin of the entity's coordinate frame, r is the radius of its bounding sphere, and ε·r is the maximum sampling radius of the shadow field 212.

In this implementation, ε is set to eight (8) for low-frequency applications and twenty (20) for all-frequency applications. In other implementations ε is set to different values for low frequency and/or all-frequency applications.

With respect to lazy occlusion updating, if only light sources 214 are moving in the scene 222, system 200 caches the visibility at each vertex for each light source 214. In this manner, as long as the occluders for a specific light source 214 remain unchanged, the cached visibilities are reused. Otherwise, shadow field module 208 recomputes the visibility for caching. In one implementation, the described rendering acceleration scheme is implemented for use in an interactive lighting design application (e.g., see, other program modules 210).

Exemplary Procedure

Figure 9:
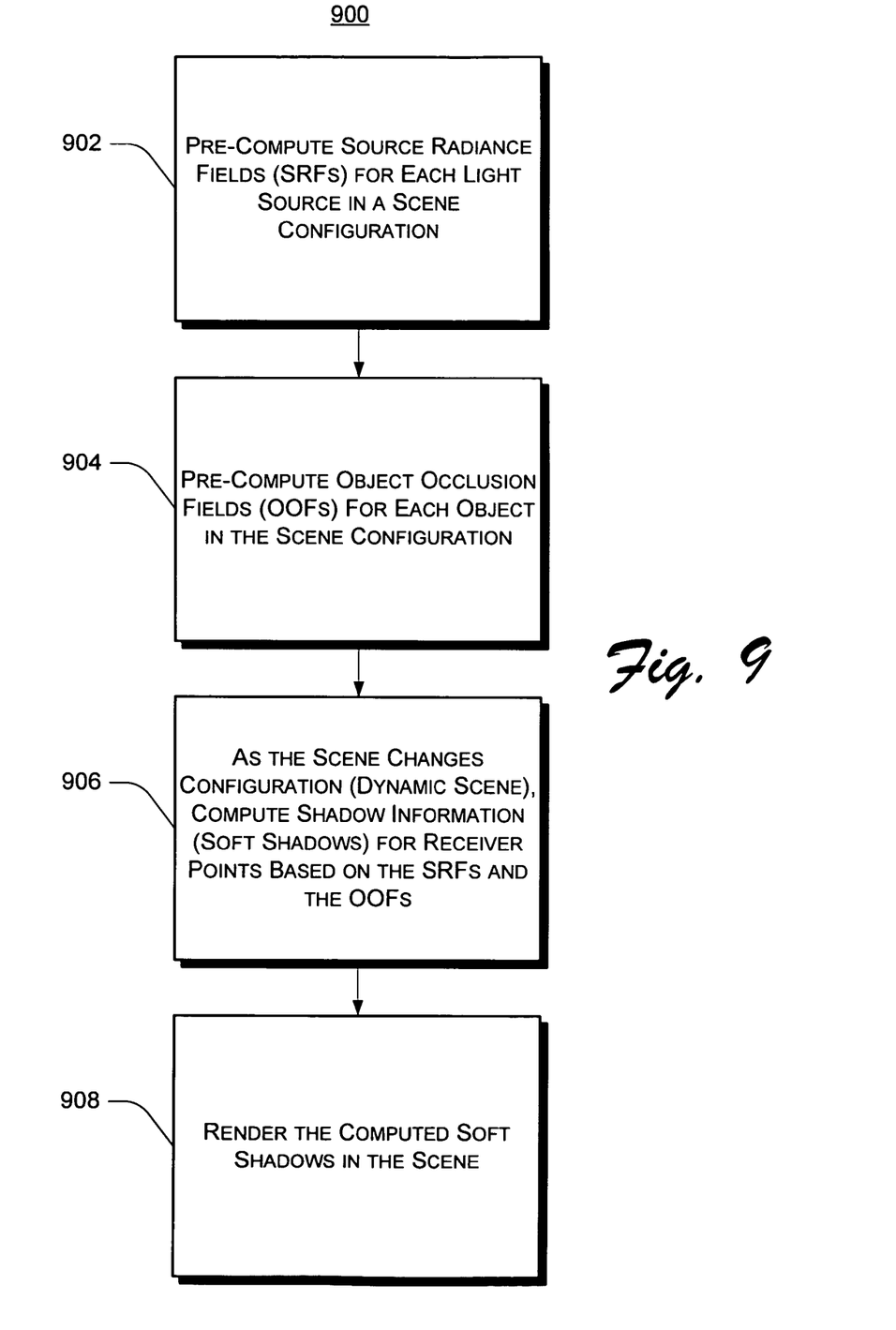
FIG. 9 shows an exemplary procedure to create and utilize shadow fields to render soft shadows in dynamic scene configurations.

FIG. 9 shows an exemplary procedure to create and utilize shadow fields to render soft shadows in dynamic scene configurations. For purposes of discussion and exemplary illustration, operations of this procedure are described with respect to components of FIG. 2. The left-most digit of a component reference number identifies the particular figure in which the component first appears. At block 902, shadow field module 208 pre-computes source radiance fields (SRFs) 218 for each light source 214. More particularly, for any one particular light source 214, an SRF 218 for the light source 214 is pre-computed at sampled locations in space surrounding the light source 214. The operations of block 902 include, for example, representing distant illumination from an environment map as a special light source $S_d$ shadow field 212.

At block 904, shadow field module 208 pre-computes object occlusion fields (OOFs) 220 for each object 216 to describe the occlusion of radiance from one or more light sources 214. At block 906, shadow field module 208 computes soft shadow information 224 for receiver points in the current scene configuration 222. To this end, shadow field module 208 determines incoming, or incident radiance distributions (e.g., see "other data" 226) from the SRFs 118 and OOFs 120 for the receiver points. Shadow field module 208 aggregates the incident radiance distributions for each receiver point from all light sources 214 to generate the soft shadow 224 for the receiver point. The operations of block 906 are performed for each change in the scene configuration 222. (In one implementation, the operations of block 906 are described above with respect to TABLE 1). At block 908, shadow field module 208, renders the soft shadow information (soft shadows) 224 into the scene 222.

An Exemplary Operating Environment

Figure 10:
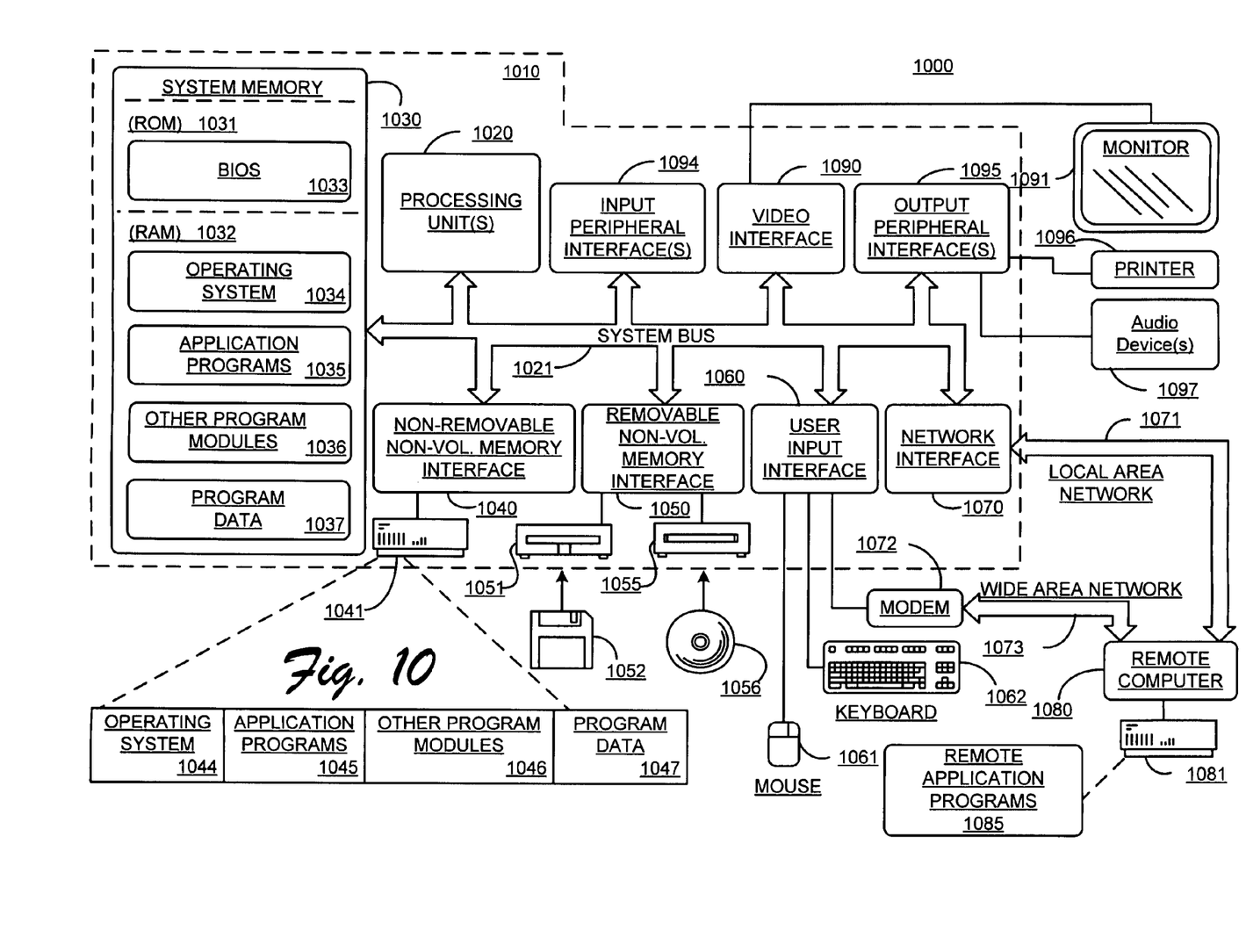
FIG. 10 illustrates an example of a suitable computing environment in which pre-computed shadow fields may be fully or partially implemented to render soft shadows in dynamic scene configurations.

FIG. 10 illustrates an example of a suitable computing environment in which pre-computed shadow fields may be fully or partially implemented to generate soft shadows in dynamic scene configurations. Exemplary computing environment 1000 is only one example of a suitable computing environment for the exemplary system 200 of FIG. 2 and exemplary operations of FIG. 9, and is not intended to suggest any limitation as to the scope of use or functionality of systems and methods the described herein. Neither should computing environment 1000 be interpreted as having any dependency or requirement relating to any one or combination of components illustrated in computing environment 1000.

The methods and systems described herein are operational with numerous other general purpose or special purpose computing system, environments or configurations. Examples of well-known computing systems, environments, and/or configurations that may be suitable for use include, but are not limited to, cellular phones, pocket PC, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention, although not required, may be practiced in a distributed computing environment where tasks are performed by remote processing devices that are linked through a communications network. In a distributed computing environment, program modules may be located in both local and remote memory storage devices.

With reference to FIG. 10, an exemplary system providing pre-computed shadow fields includes a general-purpose computing device in the form of a computer 1010 implementing, for example, system 200 of FIG. 2. Components of computer 1010 may include, but are not limited to, processing unit(s) 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 1010 typically includes a variety of computer-readable media. Computer-readable media can be any available media that can be accessed by computer 1010, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that they are at least different copies.

A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB).

A monitor 1091 or other type of display device is also connected to the system bus 1021 via an interface, such as a video interface 1090. In addition to the monitor, computers may also include other peripheral output devices such as printer 1096 and audio device(s) 1097, which may be connected through an output peripheral interface 1095.

The computer 1010 operates in a networked environment using logical connections to one or more remote computers, such as a remote computer 1080. In one implementation, remote computer 1080 represents computing device 202 of FIG. 2. The remote computer 1080 may be a personal computer, a server, a router, a network PC, a peer device or other common network node, and as a function of its particular implementation, may include many or all of the elements described above relative to the computer 1010, although only a memory storage device 1081 has been illustrated in FIG. 10. The logical connections depicted in FIG. 10 include a local area network (LAN) 1081 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example and not limitation, FIG. 10 illustrates remote application programs 1085 as residing on memory device 1081. The network connections shown are exemplary and other means of establishing a communications link between the computers may be used.

CONCLUSION

Although the systems and methods for pre-computed shadow fields have been described in language specific to structural features and/or methodological operations or actions, it is understood that the implementations defined in the appended claims are not necessarily limited to the specific features or actions described. Rather, the specific features and operations of system 200 are disclosed as exemplary forms of implementing the claimed subject matter.

The invention claimed is:

1. A computer-implemented method comprising:
   pre-computing shadow fields for multiple entities using a computing device, a shadow field representing shadowing effects of an entity at sample points in an empty space surrounding the entity, the multiple entities comprising at least one light source and at least one occluding object, a shadow field for a light source indicating radiance from the light source, a shadow field for an occluding object indicating occlusion of radiance on the occluding object as viewed from the sample points, the shadow fields being used to render shadows in dynamic scene configurations; and
   wherein the pre-computing is performed independent of scene configuration.

2. The method of claim 1, wherein each shadow field is a function of polar coordinates.

3. The method of claim 1, wherein the at least one light source comprises one or more of a local light source and a distant light source.

4. The method of claim 1, wherein the shadow fields are a function of user configurable sampling densities at sampled locations in space surrounding respective ones of the at least one light source and the at least one occluding object.

5. The method of claim 1, wherein pre-computing the shadow fields further comprises:
   representing distant illumination from a distant light source as a shadow field that is a spatially-independent source radiance field, the distant light source being represented by an environment map; and
   representing a local light source with a source radiance field based on sampled points in space surrounding the local light source.

6. The method of claim 1, wherein pre-computing the shadow fields further comprises creating a shadow field for an object of the at least one occluding object, the shadow field indicating self-occlusion of the object at a surface point on the object.

7. The method of claim 1, wherein pre-computing the shadow fields further comprises:
   pre-computing a respective source radiance field for each of the at least one lighting source;
   pre-computing a respective object occlusion field for each of the at least one occluding object.

8. The method of claim 1, wherein pre-computing the shadow fields further comprises:
   representing multiple instances of a particular light source of the at least one light source with a single source radiance field; and;
   representing multiple instances of a particular occluding object of the at least one occluding object with a single occluding object field.

9. The method of claim 1, wherein, the at least one light source and the at least one occluding object are part of a dynamic scene where one or more of the at least one light source and the at least one occluding object move with respect to surrounding space, and wherein the method further comprises:
   combining, for each object of the at least one occluding object, the shadow fields associated with the at least one light source and the object to render shadow information at one or more receiver points as a function of a current configuration of the dynamic scene.

10. The method of claim 9, wherein combining the shadow fields further comprises:
    determining, for the one or more points on the object, incident radiance distributions from each light source of the at least one light source; and
    aggregating the incident radiance distributions to generate a soft shadow for the object in the current configuration of the dynamic scene.

11. The method of claim 10, further comprising:
    detecting that only the at least one light source is moving in the dynamic scene; and
    responsive to the detecting, caching visibility with respect to each light source at the one or more points on the object for reuse.

12. The method of claim 10, wherein determining incident radiance distributions further comprises:
    determining visibility of a light source from a point on the object with respect to each different object of the at least one occluding object in a scene by:
    aligning shadow fields associated with each light source and each occluding object as a function of coordinate transformations;
    sorting the shadow fields, with respect to the point, from near to far;
    for each occluding object closer to the point then the light source:
    multiplying the associated object occlusion field to obtain a first product that resolves aggregate occlusion; and
    multiplying the first product by a source radiance field associated with the light source to yield a second product indicating source radiance arriving at the point.

13. A computer-implemented method comprising:
    pre-computing shadow fields for at least one light source and at least one occluding object, the shadow fields being used to render shadows in dynamic scene configurations using a computing device;
    wherein the pre-computing is performed independent of scene configuration; and
    wherein the pre-computing comprises:
    computing a respective source radiance field for each lighting source such that a shadow field for a light source indicates radiance from the light source;
    calculating a respective object occlusion field for each object such that a shadow field for an occluding object identifies occlusion of radiance.

14. The method of claim 13, wherein the at least one light source is one or more of a local light source and a distant light source.

15. The method of claim 13, wherein pre-computing the shadow fields further comprises creating a shadow field for an object of the at least one occluding object, the shadow field indicating self-occlusion of the object at a surface point on the object.

16. The method of claim 13, wherein pre-computing the shadow fields further comprises:

representing multiple instances of a particular light source of the at least one light source with a single source radiance field; and;

representing multiple instances of a particular occluding object of the at least one occluding object with a single occluding object field.

17. The method of claim 13, wherein pre-computing the shadow fields further comprises:

representing distant illumination from a distant light source as a shadow field that is a spatially-independent source radiance field, the distant light source being represented by an environment map; and representing a local light source with a source radiance field based on sampled points in space surrounding the local light source.

18. The method of claim 17, wherein the space is function of user configurable sampling densities at sampled locations in space surrounding respective ones of the at least one light source and the at least one occluding object.

19. The method of claim 13, wherein, the at least one light source and the at least one occluding object are part of a dynamic scene where one or more of the at least one light source and the at least one occluding object move with respect to surrounding space, and wherein the method further comprises:

combining, for each object of the at least one occluding object, the source radiance fields associated with the at least one light source and the object occlusion fields associated with the object to render shadow information at one or more points in the dynamic scene as a function of a current configuration of the dynamic scene.

20. The method of claim 13, wherein pre-computing the shadow fields further comprises:

determining, for the one or more points on the object, incident radiance distributions from each light source of the at least one light source by:

aligning shadow fields associated with each light source and each occluding object as a function of coordinate transformations;

sorting the shadow fields, with respect to the point, from near to far;

for each occluding object closer to the point then the light source:

multiplying the associated object occlusion field to obtain a first product that resolves aggregate occlusion;

multiplying the first product by a source radiance field associated with the light source to yield a second product indicating source radiance arriving at the point; and adding radiance contributions of each light source different than the light source to the second product to provide the final incoming radiance distribution of the soft shadow at the point.

* * * * *